United States Patent
Nishikawa et al.

(10) Patent No.: US 6,408,875 B1
(45) Date of Patent: Jun. 25, 2002

(54) PIPING STRUCTURE OF A WORKING MACHINE

(75) Inventors: Hiroyasu Nishikawa; Takahiro Iwamoto, both of Tokyo; Toshiyuki Matsumoto, Osaka, all of (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 0 days.

(21) Appl. No.: 09/973,051

(22) Filed: Oct. 10, 2001

Related U.S. Application Data

(63) Continuation of application No. PCT/JP00/06648, filed on Sep. 27, 2000.

(30) Foreign Application Priority Data

Mar. 13, 2000 (JP) .......................................... 2000-68518

(51) Int. Cl.[7] ......................... F16L 27/087; B66C 23/00
(52) U.S. Cl. ..................... 137/580; 285/121.6; 414/723
(58) Field of Search ....................... 137/580; 285/121.1, 285/121.3, 121.6; 414/723, 726

(56) References Cited

U.S. PATENT DOCUMENTS

| | | | | |
|---|---|---|---|---|
| 2,308,137 A | * | 1/1943 | White ........................ | 137/580 |
| 3,873,133 A | * | 3/1975 | Berg et al. ................ | 285/121.7 |
| 3,908,695 A | * | 9/1975 | Dunbar ...................... | 137/580 |
| 4,108,294 A | * | 8/1978 | Stewart et al. .......... | 137/580 X |
| 4,252,147 A | * | 2/1981 | Gerber et al. ............ | 137/580 |
| 4,683,912 A | * | 8/1987 | Dubrosky .................. | 137/580 |
| 4,844,124 A | * | 7/1989 | Stich et al. .............. | 137/580 |
| 5,065,792 A | * | 11/1991 | Ohta et al. ................. | 137/580 |
| 5,104,154 A | * | 4/1992 | Shibano ............... | 285/121.6 X |
| 6,146,082 A | * | 11/2000 | York .......................... | 414/723 |

FOREIGN PATENT DOCUMENTS

| | | |
|---|---|---|
| JP | 9-32844 | 2/1997 |
| JP | 11-241361 A | 9/1999 |
| JP | 11-255192 A | 9/1999 |

OTHER PUBLICATIONS

Patent Abstracts of Japan 11–255192A.
Patent Abstracts of Japan 11–241361A.
Patent Abstracts of Japan 9–32844.

* cited by examiner

*Primary Examiner*—John Rivell
(74) *Attorney, Agent, or Firm*—Millen, White, Zelano & Branigan, P.C.

(57) ABSTRACT

A piping structure of a working machine, which prevents the piping at a coupling portion where a pair of members are swingably coupled together via a shaft, from being damaged.

The piping structure comprises a swivel joint which is a rotary joint for fluid and is disposed, on the outer side in the radial direction of a shaft of a coupling portion where a pair of members are swingably coupled together via said shaft, so as to swing on axis of swinging motion as a center of rotation.

6 Claims, 6 Drawing Sheets

PIPING STRUCTURE OF A WORKING MACHINE

CROSS REFERENCE TO RELATED APPLICATION

This application is a continuation of International Application PCT/JP00/06648, filed Sep. 27, 2000, designating the United States, priority of which is claimed under 35 U.S.C. §120.

TECHNICAL FIELD

The present invention relates to a piping structure of a working machine. More specifically, the invention relates to a piping structure of a working machine, in which a swivel joint that is a rotary joint for fluid is provided at a coupling portion where a pair of members of a working machine are swingably coupled together via a shaft.

BACKGROUND ART

Referring to FIG. 7, various working devices, such as a working device 52 equipped with a quick coupler 51, is swingably attached to an end of an arm 50 of a hydraulic shovel which is a typical working machine, by using a shaft 54. By a swing operation link 53 provided for the arm 50, the working device 52 swings between a lower position shown by a solid line and an upper position shown by a two-dot chain line. The working device 52 is provided with a hydraulic cylinder 51a that is a fluid pressure actuator, and the hydraulic cylinder 51a and an arm 50 are coupled together through a hydraulic piping 56. A flexible hydraulic hose 56a is used for the hydraulic piping 56 in the coupling portion so as to be able to follow the swinging working of the working device 52, one end thereof being connected to a piping 56b fixed to the arm 50 and the other end thereof being connected to the hydraulic cylinder 51a of the working device 52. The illustrated hydraulic cylinder 51a is of the double-acting type, and a total of two pipings 56 are provided, one on the head side H and the other one on the rod side R.

DISCLOSURE OF THE INVENTION

The piping structure of the conventional working machine of the above-mentioned construction, however, involves problems as described below.

That is, when the working device 52 swings at an end of the arm 50, the hose 56a bends between a "stretched state (indicated by a solid line)" in which both ends thereof are separated away from each other and a "slackened state (indicated by a two-dot chain line)" in which both ends thereof are brought close to each other due to the swinging motion of the working device 52. When bent, the hose 56a is liable to come in contact with the arm 50 or the working device 52. In the "slackened state" in particular, the hose 56a hangs down between the arm 50 and the working device 52 or extends over a side portion of the arm 50, often being caught between the arm 50 and the working device 52 or coming in contact with the surrounding obstacles. Consequently, the life of the hose is shortened or the hose is damaged.

The present invention has been made in view of the above-mentioned fact, and its technical assignment is to provide a piping structure of a working machine, which makes it possible to prevent the piping at a coupling portion where a pair of members are swingably coupled together via a shaft, from being damaged.

In the present invention, as a piping structure of a working machine to solve the above-mentioned technical assignment, there is provided a piping structure of a working machine, comprising a swivel joint which is a rotary joint for fluid and is disposed, on the outer side in the radial direction of a shaft of a coupling portion where a pair of members are swingably coupled together via said shaft, so as to swing on the axis of swinging motion as a center of rotation.

In the piping structure of the working machine according to the present invention, a swivel joint is provided at the coupling portion where the pair of members are swingably coupled together. Therefore, since the piping between the pair of members is arranged via the swivel joint, it does not need to use the flexible piping such as the hose.

In a preferred embodiment, the swivel joint comprises a cylindrical stator mounted on either one of said pair of members and a rotor rotatably fitted to the outer periphery of the stator.

The swivel joint is constituted by a stator and a rotor arranged on the outer side of the shaft that couples the pair of members.

According to a preferred embodiment, further, a cylindrical boss to which the stator is fitted is provided between the stator and the shaft, the boss being attached to either one of said pair of members.

The mounting of the swivel joint on the coupling portion is guided by the boss. Further, a thrust force acting on the pair of members in the axial direction is received by the boss, so that an excessive large force will not act on the swivel joint.

In a preferred embodiment, the pair of members are an arm equipped with the working machine and a working device swingably coupled to the arm.

The piping between the arm of the working machine and the working device coupled to the arm is prevented from being damaged.

BRIEF DESCRIPTION OF THE DRAWINGS

FIG. 1 is viewed in a direction of an arrow A—A;

FIG. 2 is viewed in a direction of an arrow B—B;

FIG. 3 is viewed in a direction of an arrow C—C;

FIG. 3 is viewed in a direction of an arrow D—D;

FIG. 3 is viewed in the direction of the arrow D—D.

BEST MODE FOR PRACTICING THE INVENTION

A piping structure of a working machine constituted according to the present invention will now be described in detail with reference to the accompanying drawings.

Figure 1:
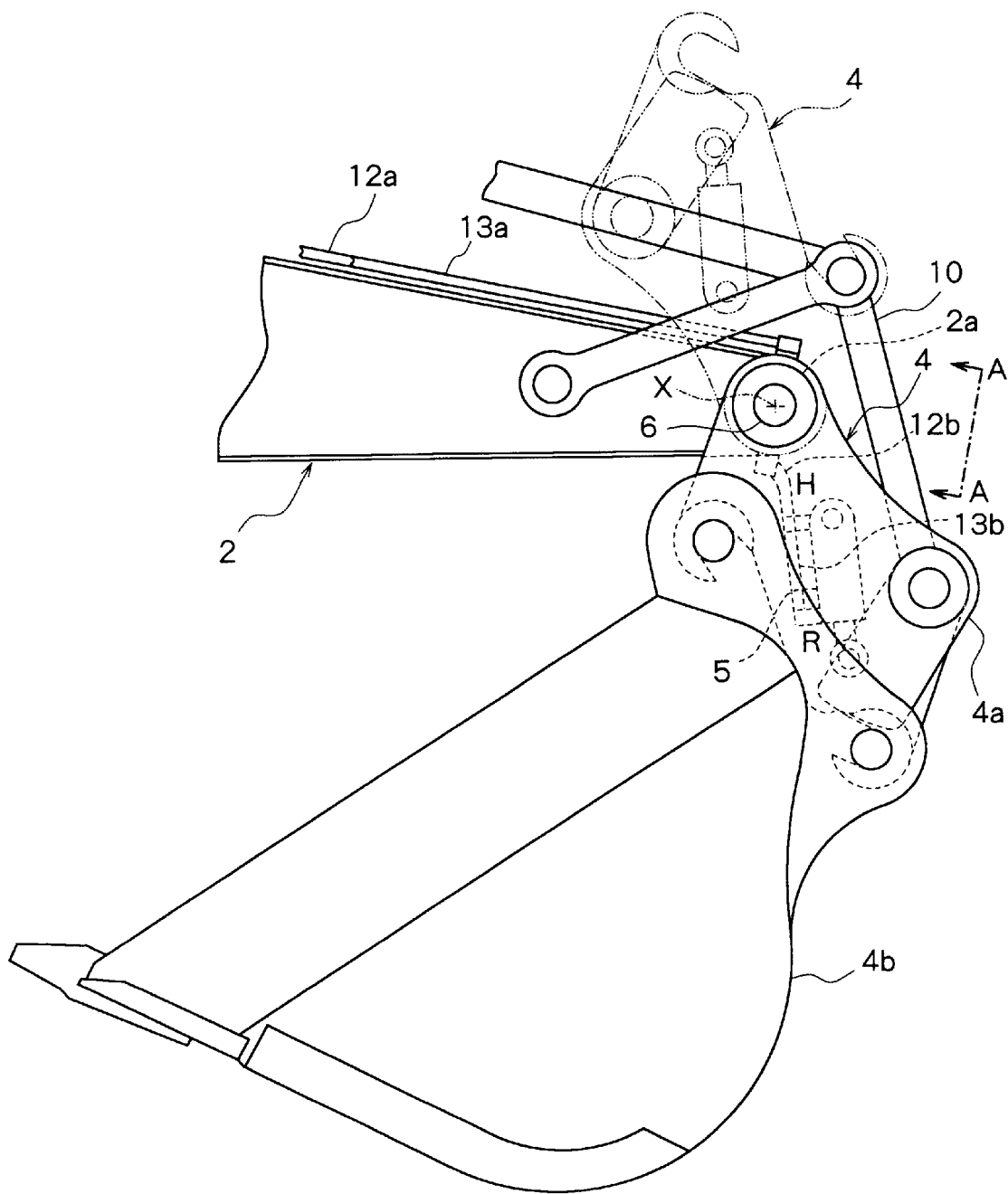
FIG. 1 is a side view of a coupling portion of an arm and a working device in a working machine having a piping structure constituted according to the present invention.
Figure 2:
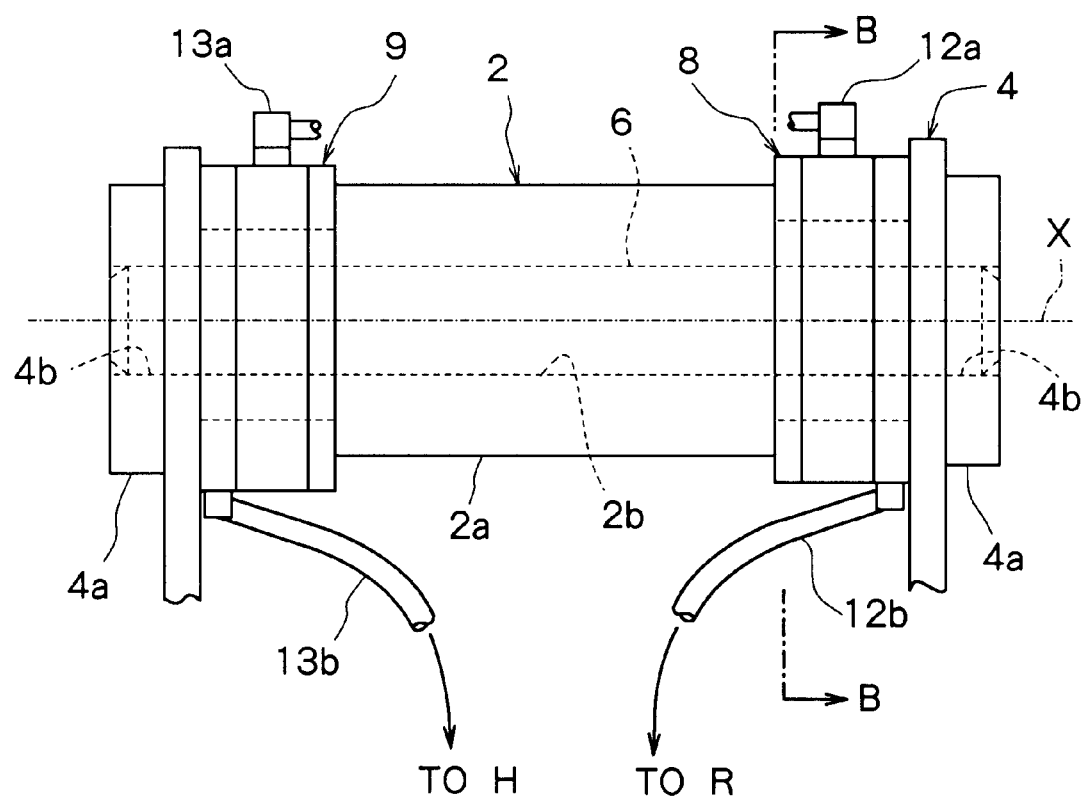
FIG. 2 is a front view of a coupling portion of when

Referring to FIGS. 1 and 2, a hydraulic shovel that is a typical working machine includes an arm 2 which is one of a pair of members to be swingably coupled, and a working device 4 which is the other of the pair of members swingably coupled to the arm 2. A shaft 6 is inserted in a bearing hole 2b formed in a boss 2a at an end of the arm 2 and in bearing holes 4*b* and 4*b* of a pair of bosses 4*a* and 4*a* of the working device 4 positioned at both ends in the axial direction of the boss 2*a*, to swingably couple the working device 4 with the arm 2. A pair of swivel joints 8 and 9 which are rotary joints for fluid, are provided between the boss 2*a* of the arm 2 and the bosses 4*a* of the working device 4 in the direction of axis X of the coupling portion, on the outer side in the radial direction of the shaft 6, so as to swing on the axis X as a center of rotation. The working device 4 has a bucket device 4*b* having a quick coupler 4*a*. By a swing operation link 10 provided for the arm 2, the working device 4 is caused to swing on the axis X as a center between a downwardly swinging position (indicated by a solid line) and an upwardly swinging position (indicated by a two-dot chain line) as shown in FIG. 1.

The working device 4 is equipped with a hydraulic cylinder 5 of the double-acting type. A piping 12*a* provided for the arm 2 is connected by a piping 12*b* to a rod end R of the hydraulic cylinder 5 via one swivel joint 8. A piping 13*a* provided for the arm 2 is connected to a head end H by a piping 13*b* via another swivel joint 9.

In this embodiment, the hydraulic cylinder 5 of the double-acting type is used for the working device 4 and hence, a pair of swivel joints 8 and 9 are used for connecting two pipings. The swivel joints 8 and 9 may be constituted in substantially the same manner. Therefore, the swivel joint 8 only is described below in detail.

Figure 3:
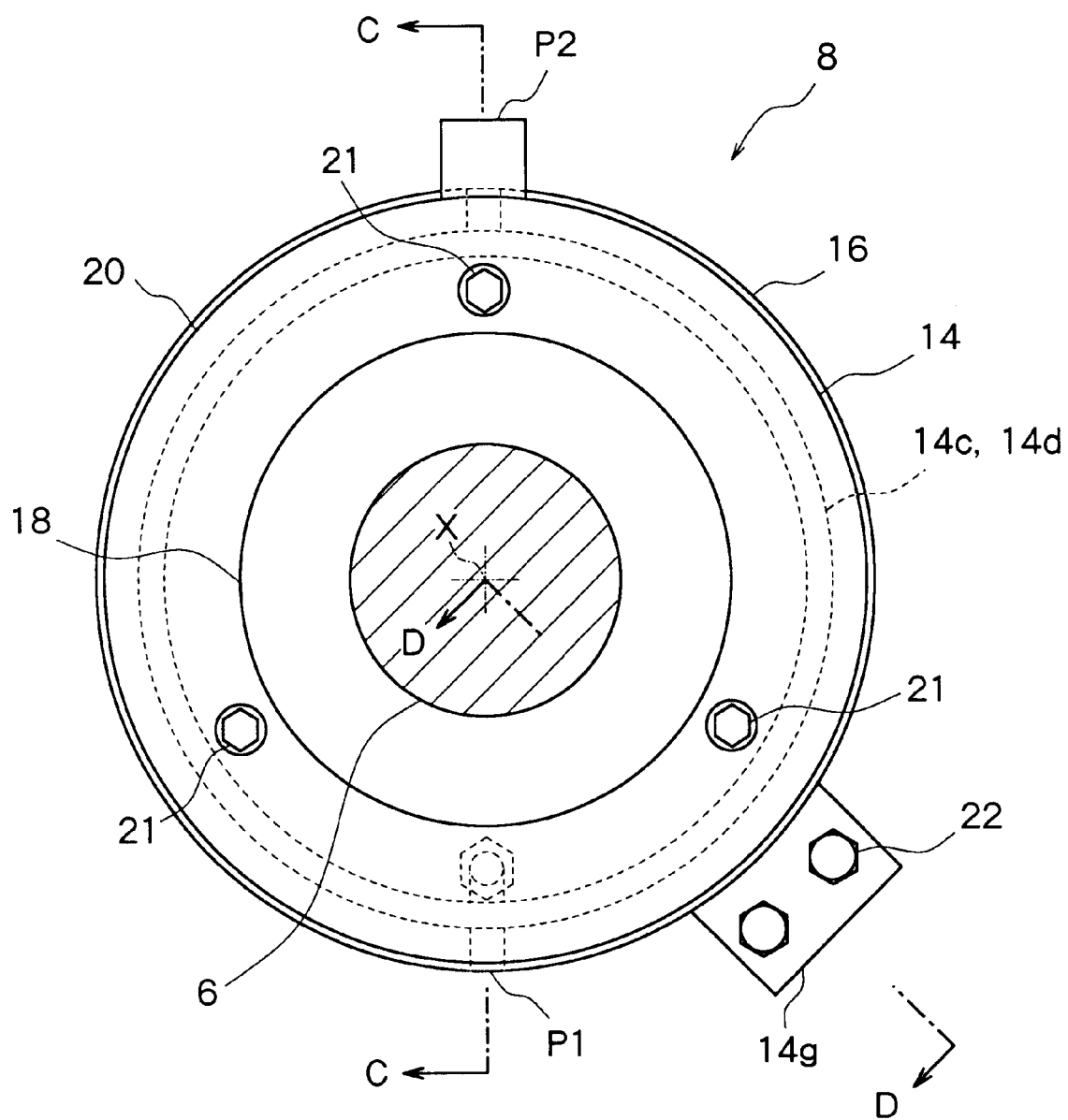
FIG. 3 is a side view of a swivel joint of when
Figure 4:
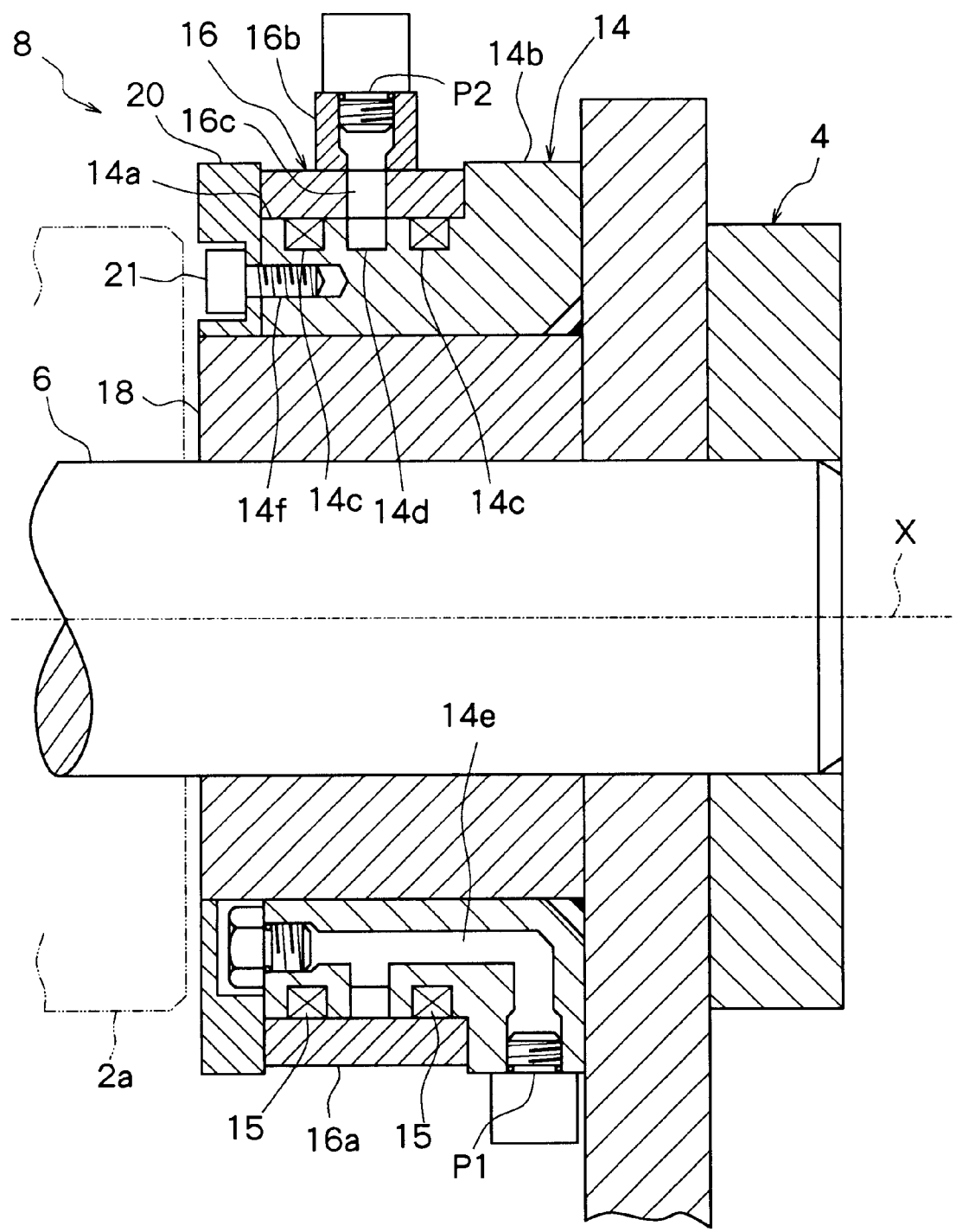
FIG. 4 is a sectional view of when

Referring to FIGS. 3 and 4, the swivel joint 8 will be explained. The swivel joint 8 comprises a cylindrical stator 14 arranged on the outer side of the shaft 6 in the radial direction and a rotor 16 rotatably fitted to the outer periphery of the stator 14. The stator 14 is mounted on the working device 4. A cylindrical boss 18 is provided between the stator 14 and the shaft 6.

The cylindrical stator 14 has a slide portion 14*a* of which the outer periphery is slidably fitted to the rotor 16 and a flange portion 14*b* formed at one end in the axial direction X (right end in FIG. 4) and having a diameter larger than that of the slide portion 14*a*. A pair of annular sealing grooves 14*c* having a rectangular shape in cross section are formed in the outer periphery of the slide portion 14*a*, spaced at a distance in the direction of axis X. An annular flow path 14*d* having a rectangular shape in cross section is formed between the sealing grooves 14*c* and 14*c* in the direction of axis X. A connection port P1 for fluid is formed in the outer periphery of the flange portion 14*b*. The port P1 is connected to the annular flow path 14*d* via a flow path 14*e* formed in the stator 14. Three threaded holes 14*f* are formed in the end surface on the side of the slide portion 14*a* of the stator 14 along a pitch circle with the axis X as a center. The inner periphery of the stator 14 has a diameter that freely fits at a minimal gap to the outer periphery of the cylindrical boss 18.

A disk-like holder plate 20 is attached to the end surface of the stator 14 having the threaded holes 14*f* formed therein, by using three bolts 21 so that the movement in the axial direction X of the rotor 16 that is fit to the outer periphery of the slide portion 14*a* is limited between the holder plate 20 and the flange portion 14*b*.

Annular sealing members 15 are mounted in the pair of sealing grooves 14*c* and 14*c* to prevent the fluid in the annular flow path 14*d* from leaking to the outer side. The sealing members 15 are known ones having a sealing lip formed of a synthetic rubber or the like.

The rotor 16 has a cylindrical rotor body 16*a*, of which a length in the axial direction X is a size that is slidably held between the flange portion 14*b* and the holder plate 20 on the outer periphery of the slide portion 14*a* of the stator 14. The inner periphery of the rotor body 16*a* has a surface that is so finished as to slide relative to the sliding portion 14*a* of the stator 14 and to permit the slide of the sealing member 15 mounted on the stator 14. A boss 16*b* in which a connection port P2 for fluid is formed is mounted on the outer periphery of the rotor body 16*a*. In the main body 16*a* and the boss 16*b* is formed a flow path 16*c* penetrating in the radial direction to communicate the port P2 with the annular flow path 14*d* of the stator 14.

The inner periphery of the cylindrical boss 18 forms a bearing hole for the shaft 6. The outer periphery of the cylindrical boss 18 has a size that freely fits to the inner periphery of the stator 14 at a minimal gap. An end of the boss 18 in the axial direction X (right end in FIG. 4) is mounted on the working device 4 as a unitary structure by a suitable means such as welding. The length of the boss 18 in the axial direction X is defined to be slightly larger than the length of a state where the holder plate 20 is attached to the stator 14.

Figure 5:
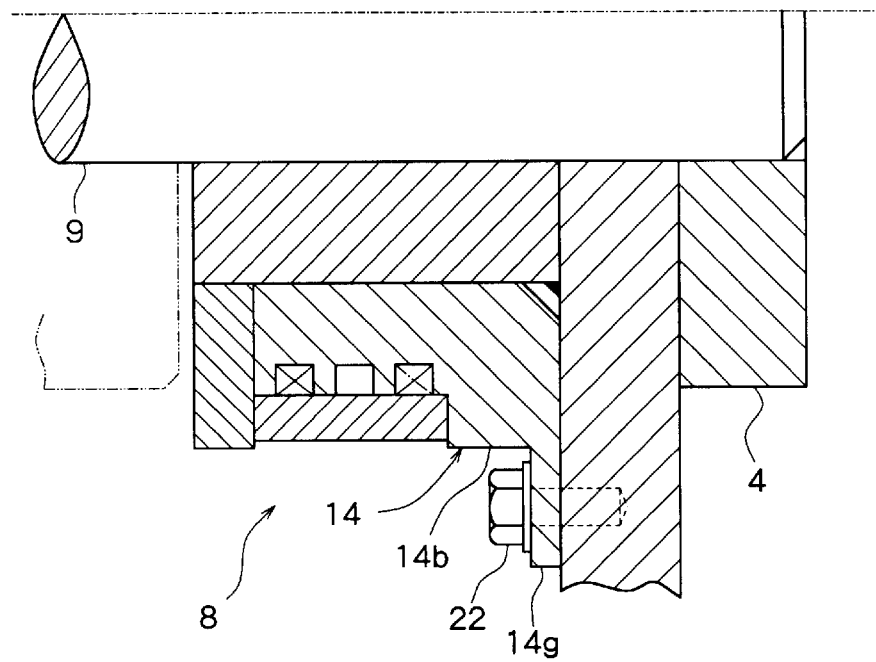
FIG. 5 is a sectional view of when

A mounting portion where the stator 14 is mounted on the working device 4 will be described with reference to FIGS. 3 and 5. On the outer periphery of the flange portion 14*b* of the stator 14, there is provided a mounting portion 14*g* is formed in a rectangular form by extending an end surface of the stator 14 on the side of the flange portion 14*b* in the radial direction. Two bolt holes are formed in the mounting portion 14*g*. Bolts 22 are passed through the bolt holes and are screwed into the threaded holes formed in the working device 4 so as to mount the stator 14 on the working device 4.

As will be easily understood with reference to FIG. 4, the connection ports P1 and P2 for fluid of the swivel joint 8 constituted as described above are communicated with each other through the flow path 14*e* in the stator 14, annular flow path 14*d* and flow path 16*c* in the rotor 16. This communication state is maintained at all times even when relative positions of the stator 14 and the rotor 16 are changed in the direction of rotation on the axis X as a center.

With reference to FIGS. 1 to 5, description will be given of the mounting of the swivel joints 8 and 9 onto a portion which couples the arm 2 and the working device 4 together, and of connection of pipings to the swivel joints 8 and 9.

(1) Mounting the Swivel Joints on the Working Device

Prior to coupling the working device 4 to the end of the arm 2 by the shaft 6, the swivel joint 8 is mounted on the working device 4 by fitting the stator 14 to the boss 18 provided on the working device 4 and by securing the mounting portion 14*g* to the working device 4 with bolts 22. Another swivel joint 9 is also mounted on the working device 4 in the same manner.

(2) Coupling the Arm and the Working Device Together

The shaft 6 is inserted in the pair of bearing holes 4*b* and 4*b* of the working device 4 on which the swivel joints 8 and 9 are mounted and in the bearing hole 2*b* of the arm 2 in concentric with the axis X thereof, thereby to couple the arm 2 and the working device 4 together.

(3) Piping

The piping 12*a* on the side of the arm 2 is connected to the connection port P2 of the swivel joint 8, and the piping 12*b* on the side of the working device 4 is connected to the connection port P1. Similarly, the piping 13*a* on the side of the arm 2 is connected to the piping 13*b* on the side of the working device 4 via the swivel joint 9.

In this embodiment, the swivel joints 8 and 9 are provided at the portion where the pair of members are swingably coupled together, i.e. the arm and the working device 4 are swingably coupled together. Therefore, even when the working device 4 swings relative to the arm 2, no relative change between the piping 12a on the side of the arm 2 and the connection port P1 occurs. Therefore, a pipe member such as a steel pipe is used as the piping 12a. Though there is no relative change between the working device 4 and the connection port P2, the piping 12b is directly connected to the hydraulic cylinder 5 in this embodiment and hence, a hose is used as the piping 12b. Similarly, a pipe member such as a steel pipe is used as the piping 13a and a hose is used as the piping 13b.

The action of the piping structure of the above-mentioned working machine will now be described with reference to FIGS. 1 to 5.

(1) Prevention of Damage to the Piping

Since the swivel joints 8 (9) is provided at the coupling portion where the arm 2 and the working device 4 are coupled together by the shaft 6, in such a manner that the center of rotation is in concentric with the axis X of the shaft 6, the piping connected to the swivel joint 8 (9) is not affected by the swinging motion of the working device 4. Therefore, there is no need of using a hose that can bend in conformity with the swinging motion of the working device 4 unlike that of the prior art and hence, there occurs no hanging or extension of the hose. Further, the piping can be mounted in a fixed manner and hence, a pipe member such as a steel pipe can be used, making it possible to effectively prevent damage to the piping used under severe conditions of the working machine, such as a portion where the arm and the working device are coupled together. Further, durability of the piping can be improved.

(2) Freedom for Piping

The connection ports P1 and P2 of the swivel joint 8 (9) can be freely positioned in the direction of rotation on the axis 6 as a center. Therefore, the piping can be installed at any positions such as on the side surface or on the upper surface of the arm to fit the specifications and shape of the working machine, arm, and working device.

(3) Strong Swivel Joint

The outer peripheral shape of the swivel joint 8 (9) can be formed in any shape substantially the same as the shape of the arm or the working device at the coupling portion. Therefore, the swivel joint 8 (9) is structurally strong and is little likely to be damaged by foreign matters or obstacles. Further, since the thrust load from the working device 4 in the axial direction X is received by the boss 18 that is inserted in the swivel joint 8 (9), the thrust load does not act on the swivel joint 8 (9) which therefore is prevented from being damaged by the thrust load.

(4) Easy Mounting

The boss 18 works to automatically bring the center of rotation of the swivel joint 8 (9) to be in alignment with the axis X of the shaft 6 and hence, facilitates the mounting of the swivel joint.

(5) Mounting the Swivel Joints on the Working Device

When the swivel joint 8 (9) is mounted on the working device 4, the arm 2 may be the one having standard specifications. This makes it possible to suitably mount the working device on plural working machines equipped with a standard arm without the need of modifying the arm. Therefore, the general applicability of the working machine can be enhanced.

Though the invention was described above in detail by way of an embodiment, it should be noted that the invention is in no way limited to the above embodiment only but can be varied or modified in a variety of ways without departing from the scope of the invention.

(1) Mounting the Swivel Joints onto the Arm

Figure 6:
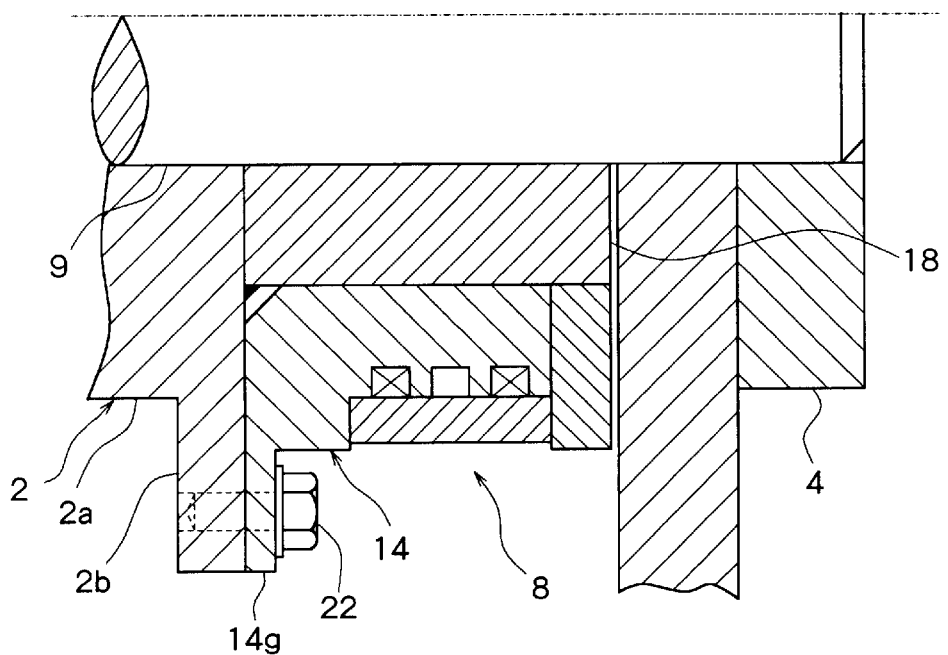
FIG. 6 is a sectional view illustrating another mounting state of mounting a stator of the swivel joint of when
Figure 7:
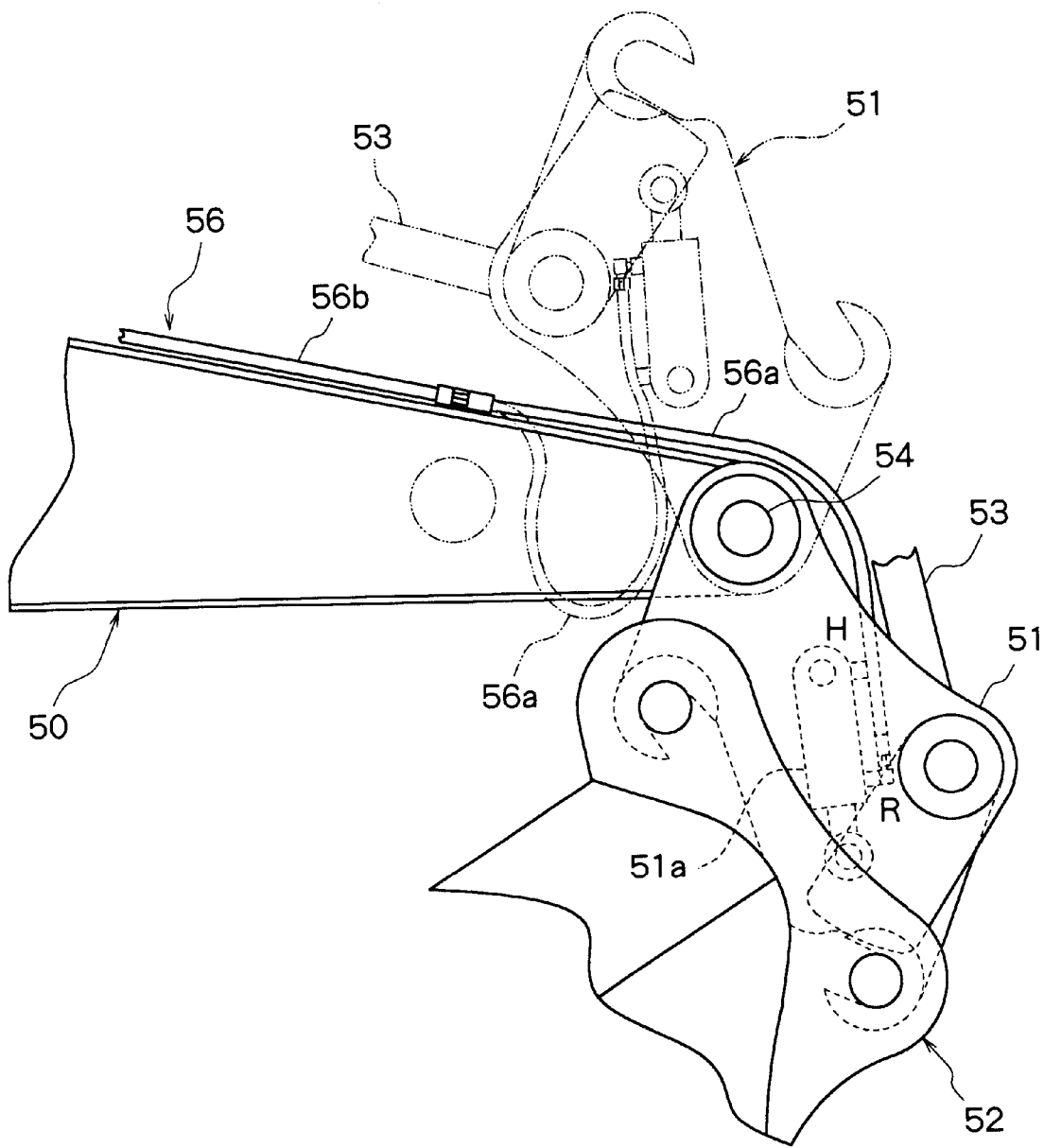
FIG. 7 is a side view illustrating a conventional piping structure.

In the embodiment of the invention, the swivel joint 8 (9) is mounted on the working device 4 which is one of a pair of members, but may be mounted on the arm 2 which is the other member of the pair of members as shown in FIG. 6. That is, the boss 2a of the arm 2 is provided with a mounting portion 2b having a threaded hole, and the mounting plate 14g of the stator 14 is secured to the mounting portion 2b with bolts 22, whereby the swivel joint 8 (9) is mounted on the arm 2. By mounting the swivel joint 8 (9) on the arm 2, the arm of the working machine is provided with the swivel joint and hence, any standard working device can be suitably mounted on the arm.

(2) Mounting the Cylindrical Boss onto the Arm

In the embodiment of the present invention, the cylindrical boss 18 is mounted on the working device 4. As shown in FIG. 6, however, the cylindrical boss 18 may be mounted on the arm 2. Further, it is allowable to mount the cylindrical boss on the arm 2 in FIG. 4 or to mount it on the working device 4 in FIG. 6.

(3) Number of Swivel Joints at the Coupling Portion

In the embodiment of the invention, the swivel joints are provided in a total number of two at each of both ends of the shaft 6 of the coupling portion. However, when only one piping is required for the actuator of the working device 4, the swivel joint may be provided in a number of one on either side. When many pipings are required for the actuators, a single swivel joint may be provided with plural annular flow paths, thereby to provide plural connection ports to allow them to connect with plural pipings.

According to the piping structure of the working machine constituted according to the present invention, there is provided a piping structure of the working machine, which can prevent the piping at the coupling portion where a pair of members are swingably coupled together via a shaft, from being damaged.

What is claimed is:

1. A piping structure of a working machine, comprising a swivel joint which is a rotary joint for fluid and is disposed, on the outer side in the radial direction of a shaft of a coupling portion where a pair of members are swingably coupled together via said shaft, so as to swing on the axis of swinging motion as a center of rotation.

2. A piping structure of a working machine according to claim 1, wherein said swivel joint comprises a cylindrical stator mounted on either one of said pair of members and a rotor rotatably fitted to the outer periphery of said stator.

3. A piping structure of a working machine according to claim 2, wherein a cylindrical boss to which the stator is fitted is provided between said stator and said shaft, said boss being provided on either one of said pair of members.

4. A piping structure of a working machine according to claim 1, wherein said pair of members are an arm provided for said working machine and a working device swingably coupled to said arm.

5. A piping structure of a working machine according to claim 2, wherein said pair of members are an arm provided for said working machine and a working device swingably coupled of said arm.

6. A piping structure of a working machine according to claim 3, wherein said pair of members are an arm provided for said working machine and a working device swingably coupled to said arm.

* * * * *